United States Patent [19]

Imai et al.

[11] Patent Number: 4,537,944
[45] Date of Patent: Aug. 27, 1985

[54] ROOM TEMPERATURE CURABLE POLYORGANOSILOXANE COMPOSITION

[75] Inventors: Takafumi Imai; Fumihiko Kobayashi, both of Ohta, Japan

[73] Assignee: Toshiba Silicone Co., Ltd., Tokyo, Japan

[21] Appl. No.: 623,275

[22] Filed: Jun. 21, 1984

[30] Foreign Application Priority Data

Jul. 11, 1983 [JP] Japan .................. 58-125649

[51] Int. Cl.³ .............................................. C08G 77/06
[52] U.S. Cl. ...................... 528/18; 524/265; 524/267; 524/368; 524/376; 524/377; 524/731; 524/761; 524/859; 524/860; 524/762; 528/15; 528/19; 528/32; 528/33; 528/34; 528/901
[58] Field of Search ............. 528/901, 32, 33, 34, 528/15, 18, 19; 524/265, 267, 368, 376, 377, 731, 761, 859, 860, 762

[56] References Cited

U.S. PATENT DOCUMENTS

| | | | |
|---|---|---|---|
| 4,302,571 | 11/1981 | Arai et al. | 528/34 |
| 4,323,488 | 4/1982 | Takago et al. | 528/34 |
| 4,395,526 | 7/1983 | White et al. | 528/21 |
| 4,417,042 | 11/1983 | Dziark | 528/18 |

Primary Examiner—Melvyn I. Marquis
Attorney, Agent, or Firm—Gary L. Loser

[57] ABSTRACT

The present invention provides a room temperature curable polyorganosiloxane composition comprising:
(A) 100 parts by weight in total of:
  (1) a polydiorganosiloxane of the general formula:

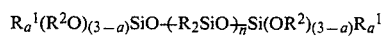

(2) a silane of the general formula:

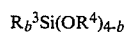

(B) 0.01 to 10 parts by weight of a curing catalyst;
(C) 0.5 to 10 parts by weight of a nitrogen-containing silicon compound in which the nitrogen atom is bonded with a silicon atom through one or more carbon atoms and said nitrogen atom is further bonded directly with said silicon atom or another silicon atom; and
(D) 0.05 to 50 parts by weight of a polyoxyalkylene chain-containing compound.

20 Claims, No Drawings

ROOM TEMPERATURE CURABLE POLYORGANOSILOXANE COMPOSITION

The present patent application claims priority of Japanese patent application Ser. No. 83/125649, filed July 11, 1983.

BACKGROUND OF THE INVENTION

The present invention relates to a polyorganosiloxane composition. More particularly, the invention relates to a room temperature curable polyorganosiloxane composition which is stable under moisture free, hermetically closed conditions and which cures upon contact with water contained in air at room temperature to form an elastomer.

Among polyorganosiloxane compositions which cure at room temperature to form elastomers, one-package types which cure upon contact with water contained in the air have been used widely as elastic adhesives or coating agents in the electrical and electronic industries. Also such compositions have been used as sealants in the construction industry since they necessitate no troublesome step of weighing the same, a crosslinking agent and/or a curing catalyst, or mixing them together and, therefore, no failures are caused in these steps and they have excellent contact properties.

These compositions comprise a silanol terminated polydiorganosiloxane and a crosslinking agent having more than two hydrolyzable groups. Upon curing, they release acetic acid, a long-chain carboxylic acid, organic amine, amide, organic hydroxylamine, oxime compoud, alcohol or acetone depending on the crosslinking agent used.

A composition which releases acetic acid upon curing has quite excellent adhesion and curing properties. However, it has a problem of environmental hygiene due to the irritative smell thereof. Further, when it is applied to metals, a measure to counter its corrosiveness is required. A composition which releases a long-chain carboxylic acid has a problem in that rusting of metals, particularly after immersion in water, cannot be prevented easily, though it has no irritative smell. A composition which releases an amine has the problem that the amine formed is odorous and toxic. Compositions which release hydroxylamine, oxime or amide have problems in that they rust metals, particularly copper and its alloys. Though a composition which releases acetone cures rapidly and has no corroding property, it has the problems that a crosslinking agent contained therein cannot be synthesized easily and it turns yellow during storage.

A composition which releases an alcohol has the advantages that an alkoxysilane used as the crosslinking agent is available at a low cost, the released substance is an alcohol, such as methanol or ethanol, which is easily volatilized and no odor or corrosion problem is caused. However, compositions of this type have defects in that they set slowly and that the crosslinking agent is hydrolyzed by a very small amount of water contained therein during storage to form an alcohol which causes cracking of the base polymer to make the storability poor. Thus it is desirable to overcome these defects, particularly in the electrical and electronic industries, where room temperature curable polyorganosiloxane compositions are frequently used as an adhesive or coating material. The curable composition sometimes is cured in contact with copper or its alloy to form an elastomer. Similarly, compositions releasing an oxime, acetone or alcohol have been used and it is also necessary to overcome the above-mentioned defects in them.

Recently a room temperature curing polyorganosiloxane composition of the one-package type comprising a polydiorganosiloxane having an alkoxyl group bonded to the terminal silicon atoms, an alkoxysilane, a curing catalyst and an alcohol scavenger has been found. This composition has a high storage stability and rapid curing properties. It has also been found that when a compound containing a silicon-nitrogen bond which forms a non-volatile nitrogen-containing compound upon reaction with an alcohol is used as the alcohol-scavenger, no corroding effect is made on copper or its alloy.

Though the fast-cure, room temperature curable polyorganosiloxane composition which does not rust copper or its alloy is useful as an adhesive or coating material in the electric and electronic industries, the elastomer obtained has defects in that cracks are formed on its surface and its physical properties and durability are reduced. This appears to be because the compound containing silicon-nitrogen bonds used as the alcohol scavenger is hydrolyzed to form a hydrolyzate, which oozes out to the surface to resinify the surface.

After intensive investigations made for the purpose of producing a fast curing room temperature curable polyorganosiloxane composition free from the resinification of the silicone elastomer surface or corrosion, and capable of maintaining the elasticity of the surface after curing, the present inventors have found that a compound containing a polyoxyalkylene chain in its molecule is effective for the prevention of the resinification. The present invention has been completed on the basis of this finding.

SUMMARY OF THE INVENTION

In accordance with the present invention there is provided a room temperature curable polyorganosiloxane composition comprising:
(A) 100 parts by weight in total of:
(1) a polydiorganosiloxane of the general formula:

$$R_a^1(R^2O)_{(3-a)}SiO-R_2SiO-_nSi(OR^2)_{(3-a)}R_a^1$$

wherein R and $R^1$ are the same or different and represent a monovalent substituted or unsubstituted hydrocarbon group, $R^2$ represents a monovalent group selected from the group consisting of alkyl groups having 1 to 4 carbon atoms and alkoxyalkyl groups having 1 to 6 carbon atoms in total, a represents a number of 0 or 1 and n represents a number for controlling the viscosity of (a) from 100 to 500,000 cP at 25° C., and
(2) a silane of the general formula:

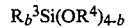
$$R_b^3Si(OR^4)_{4-b}$$

wherein $R^3$ represents a monovalent substituted or unsubstituted hydrocarbon group, $R^4$ represents a monovalent group selected from the group consisting of alkyl groups having 1 to 4 carbon atoms and alkoxyalkyl groups having 1 to 6 carbon atoms in total and b represents a number of 0 or 1, or a partially hydrolyzed condensate thereof with the proviso that the amount of (A)(1) is 85 to 100 wt. % based on the total of (A)(1) and (A)(2);
(B) 0.01 to 10 parts by weight of a curing catalyst;

(C) 0.5 to 10 parts by weight of a nitrogen-containing silicon compound in which the nitrogen atom is bonded with a silicon atom through one or more carbon atoms and said nitrogen atom is further bonded directly with said silicon atom or another silicon atom; and (D) 0.05 to 50 parts by weight of a polyoxyalkylene chain-containing compound.

DESCRIPTION OF THE INVENTION

The present invention relates to a room temperature curable polyorganosiloxane composition comprising:
(A) 100 parts by weight in total of:
(1) a terminal-reactive polydiorganosiloxane of the general formula:

$$R_a^1(R^2O)_{(3-a)}SiO-R_2SiO-_nSi(OR^2)_{(3-a)}R_a^1$$

wherein R and $R^1$ are the same or different and represent a monovalent substituted or unsubstituted hydrocarbon group, $R^2$ represents a monovalent group selected from the group consisting of alkyl groups having 1 to 4 carbon atoms and alkoxyalkyl groups having 1 to 6 carbon atoms in total, a represents a number of 0 or 1 and n represents a number for controlling the viscosity of (A) from 100 to 500,000 cP at 25° C., and (2) a silane of the general formula:

$$R_b^3Si(OR^4)_{4-b}$$

wherein $R^3$ represents a monovalent substituted or unsubstituted hydrocarbon group, $R^4$ represents a monovalent group selected from the group consisting of alkyl groups having 1 to 4 carbon atoms and alkoxyalkyl groups having 1 to 6 carbon atoms in total and b represents a number of 0 or 1 or a partially hydrolyzed condensate thereof, with the proviso that the amount of (A)(1) is 85 to 100 wt. % based on the total of (A)(1) and (A)(2);

(B) 0.01 to 10 parts by weight of a curing catalyst;

(C) 0.5 to 10 parts by weight of a nitrogen-containing silicon compound in which the nitrogen atom is bonded with a silicon atom through one or more carbon atoms and said nitrogen atom is further bonded directly with said silicon atom or another silicon atom; and (D) 0.05 to 50 parts by weight of a polkyoxyalkylene chain-containing compound.

The component (A)(1) used in the present invention is the base polymer of the composition and is represented by the above general formula wherein R represents an alkyl group such as a methyl, ethyl, propyl, butyl, hexyl or decyl group, an alkenyl group such as a vinyl or allyl group; an aryl group such as a phenyl group; or an aralkyl group such as a β-phenylethyl or β-phenylpropyl group or a group corresponding to one of these hydrocarbon groups in which the hydrogen atoms are partially replaced with a halogen atom or a nitrile group. From the viewpoint of ease of synthesis R is preferably a methyl, vinyl or phenyl group. Other organic groups are chosen when special properties such as oil resistance or coatability are required of the elastomer obtained after curing.

It is preferred that the ratio of the methyl groups to the total number of organic groups be at least 85%, and more preferably nearer 100%, since an intermediate containing the methyl group can be obtained most easily. The viscosity of the polymer corresponds to the polymerization degree of the siloxane is the lowest and the extrusion workability of the composition before curing is advantageously balanced with the physical properties of the elastomer after curing. However, when cold resistance and thermal resistance are required of the elastomer, it is preferred that part of the organic groups are phenyl groups.

As $R^1$, the same organic group as R may be mentioned. Among them, the methyl or vinyl group is preferred from the viewpoint of ease of synthesis and crosslinking reaction rate.

$R^2$ in the above general formula is an alkyl group such as a methyl, ethyl, propyl or butyl group or an alkoxyalkyl group such as a methoxyethyl or ethoxyethyl group. From the viewpoint of ease of synthesis and crosslinking reaction rate, the methyl group is the most preferred.

In the present invention, the terminal-reactive polydiorganosiloxane has a viscosity at 25° C. of preferably 100 to 500,000 cP to impart a suitable extrudability to the uncured composition and also to impart excellent mechanical properties to the elastomer formed after curing. When the viscosity of the polydiorganosiloxane is below 100 cP, the elongation of the resulting elastomer is insufficient. When the viscosity exceeds 500,000 cP, no homogeneous composition can be obtained easily and the extrusion workability is reduced. The viscosity particularly preferred for obtaining well balanced properties before and after the curing is in the range of 500 to 200,000 cP.

The silane (A)(2) or the partially hydrolyzed condensate thereof used in the present invention is a crosslinking agent which reacts with the alkoxy group of (A)(1) in the presence of water and the curing catalyst to cure the composition. It is represented by the general formula:

$$R_b^3Si(OR^4)_{4-b}$$

As $R^3$ in the above general formula, there may be mentioned the same groups as the organic group R directly bonded with the silicon atom of the (A)(1) component. Among them the methyl or vinyl group is preferred from the viewpoint of easy availability or curing speed. As $R^4$, the same groups as $R^2$ in component (A)(1) may be mentioned.

The compounds of the above general formula include, for example, tetramethoxysilane, methyltrimethoxysilane, ethyltrimethoxysilane, vinyltrimethoxysilane, phenyltrimethoxysilane, tetraethoxysilane, methyltriethoxysilane, methyltriisopropoxysilane, phenyltriethoxysilane, tetra(ethoxyethoxy)silane, methyltri(methoxyethoxy)silane, vinyltri(methoxyethoxy)silane and siloxanes which are made by partial hydrolyzation and condensation of these silanes.

Among them, tetramethoxysilane, methyltrimethoxysilane, vinyltrimethoxysilane, methyltri(methoxyethoxy)silane, and vinyltri(methoxyethoxy)silane are particularly preferred, since they can be synthesized easily and they exibit a higher curing speed of the composition without reducing the storage stability of the composition.

The component (A) may be either the base polymer (A)(1) alone which may have crosslinkability or a mixture of (A)(1) and the crosslinking agent (A)(2). The ratio of (A)(1) to (A)(2) in (A) is in the range of 85 to 100/0 to 15 (wt. %). When the amount of (A)(2) exceeds 15 wt. %, (A)(2) bleeds out from the composition during the storage and the composition shrinks significantly in the curing step to damage the physical properties of the resulting elastomer.

When more than two alkoxyl groups on average per molecule of (A)(1) are bonded with the terminal silicon atom of the polydiorganosiloxane (A)(1), the reaction proceeds in the presence of water and the curing catalyst even without using the silane (A)(2) or the partially hydrolyzed condensate thereof. However, to obtain well-balanced mechanical properties of the composition before and after the curing, it is preferred that (A) contains 0.4 to 5 wt. % of (A)(2).

The component (B) used in the present invention is a curing catalyst for obtaining the elastomer by reacting (A)(1) alone or both (A)(1) and (A)(2) in the presence of water. The component (B) includes, for example, metal carboxylates such as iron octoate, cobalt octoate, manganese octoate, zinc octoate, tin naphthenate, tin caprylate and tin oleate; and organotin compounds such as dibutyltin diacetate, dibutyltin dioctoate, dibutyltin dilaurate, dibutyltin dioleate, diphenyltin diacetate, dibutyltin oxide, dibutyltin dimethoxide, dibutylbis(triethoxysiloxy)tin and dioctyltin dilaurate. Among them, the organotin compounds are preferred, since they exhibit a high catalytic activity even in a very small amount. The amount of (B) is 0.01 to 10 parts by weight, preferably 0.1 to 1 part by weight, per 100 parts by weight of (A). When the amount of (B) is smaller than 0.01 part by weight, no sufficient catalytic effects can be obtained, a long time is required for the curing and, particularly, the inside of the elastomer layer not in contact with air cannot be cured sufficiently. When the amount of (B) exceeds 10 parts by weight, the storage stability is reduced.

The nitrogen-containing silicon compound (C), in which the nitrogen atom is bonded with a silicon atom through one or more carbon atoms and said nitrogen atom is further bonded directly with said silicon atom or another silicon atom, is used in the present invention for scavenging alcohol formed in the step of preparing the mixture of (A) and (B), during the storage in a hermetically closed vessel, or for improving the storage stability of the composition. The silicon compounds (C) include, for example, N-trimethylsilyl γ-aminopropyltrimethoxysilane, N-trimethylsilyl-γ-aminopropyltriethoxysilane, N-(N'-trimethylsilyl-β-aminoethyl)aminopropyltrimethoxysilane, 1,1-dimethoxy-2-trimethylsilyl-1-sila-2-azacyclopentane and poly(1,1-dimethoxy-5-trimethylsilyl-1-sila-5-azapentane). These compounds may be used either alone or in the form of a mixture of them. Among them, those preferred from the viewpoint of ease of synthesis and alcohol-scavenging effectiveness are N-trimethylsilyl-γ-aminopropyltriethoxysilane, 1,1-dimethoxy-2-trimethylsilyl-1-sila-2-azacyclopentane and a ring-opening polymer thereof, i.e. poly(1,1-dimethoxy-5-trimethylsilyl-1-sila-5-azapentane).

The amount of (C) is 0.5 to 10 parts by weight, preferably 1 to 5 parts by weight, per 100 parts by weight of (A). When the amount of (C) is less than 0.5 part by weight, the storage stability of the composition is reduced. On the other hand, an increase of the amount to more than 10 parts by weight is meaningless and uneconomical. Further, with such an excessive amount of (C), the physical properties and thermal resistance of the elastomer obtained by curing are damaged and it turns remarkably yellow upon heating.

The polyoxyalkylene chain-containing compound (D) is an important component of the present invention. This compound (D) is effective for preventing the resinification of the surface of the elastomer obtained by curing the composition comprising (A), (B) and (C) and also for improving the physical properties and durability thereof. The polyoxyalkylene groups include, for example, polyoxyethylene, polyoxypropylene and polyoxytrimethylene groups. More particularly, compound (D) includes the following polyoxyalkylenes:

$C_4H_9O[CH_2CH_2O]_pH$ (p=5~500);
$C_4H_9O[CH_2CH_2O]_pCH_3$ (p=5~500);
$C_4H_9O[CH_2CH_2O]_p[CH_2CH(CH_3)O]_qH$
   (p+q=5~500, p/q=0.01~100);
$HO[CH_2CH(CH_3)O]_qOH$ (q=5~400);
$C_4H_9O[CH_2CH(CH_3)O]_qOH$ (q=5~400)

as well as their alkyl ethers and alkylphenyl ethers and polyorganosiloxane/polyoxyalkylene copolymers of the formula:

$$(CH_3)_3SiO[(CH_3)_2SiO]_x[(CH_3)SiR^5O]_ySi(CH_3)_3$$

wherein $R^5$ represents a polyoxyalkylene chain bonded with the silicon atom through one or more carbon atoms, x represents a number of 0 to 100 and y represents a number of 1 to 20. They are produced on a commercial scale and readily available on the market.

The amount of the polyoxyalkylene chain-containing compound (D) used in the invention is 0.05 to 50 parts by weight, preferably 0.1 to 10 parts by weight, per 100 parts by weight of (A). When the amount is less than 0.05 part by weight, no effect on preventing the surface resinification is exhibited. The use of an excessive amount of compound (D) is less effective and economically disadvantageous. Further, when the compound (D) is used in an excessive amount, the resulting elastomer becomes excessively soft and bleeding occurs frequently.

In the present invention it is preferred to incorporate an inorganic filler in the composition in addition to the above-mentioned components so as to impart a suitable fluidity to the uncured composition and the high mechanical strength required of the cured elastomer used as a sealant or the like. The reinforcing inorganic fillers include, for example, fumed silica, calcined silica, precipitated silica, fumed titanium oxide and those having a hydrophobic surface by treatment with an organochlorosilane, a polyorganosiloxane or hexamethyldisilazane. The unreinforcing fillers include calcium carbonate, calcium carbonate surface-treated with an organic acid, diatomaceous earth, ground silica, aluminosilicate, magnesia and alumina. When a particularly low modulus is required of the composition used as a construction sealant the use of an unreinforcing filler is preferred.

When the amount off the reinforcing inorganic filler is insufficient, no effect of improving the mechanical properties can be obtained. On the other hand, when the amount is excessive, the modulus becomes excessive and the elongation at rupture is reduced. Therefore, the amount of these filler, if present, is preferably 1 to 500 parts by weight, more preferably 5 to 150 parts by weight, per 100 parts by weight of (A).

The composition of the present invention may further contain pigment, thixotropic agent, viscosity modifier for improving the extrusion workability, ultraviolet light shielding agent, anti-mildew agent, heat-resistance-improving agent, adhesion promoter or flame retarding agent.

The composition of the present invention is obtained by mixing the above-mentioned components and, if necessary, other additives under moisture-free conditions.

The resulting composition is stored in a closed vessel and is cured at the time of its use by exposing it to moisture in the air. Thus it is a so-called, one-package room temperature curable polyorganosiloxane composition.

The composition of the present invention may be used also as a so-called, two-package room temperature curable polyorganosiloxane. Namely, the components (A), (C) and (D) are stored in a vessel other than that of the component (B) and they are mixed together at the time of use.

The following examples will further illustrate the present invention. In the examples, parts are given by weight and the viscosities are determined at 25° C. In these examples, the following compounds A-1 to A-6 were used as the polyoxyalkylene chain-containing compounds:

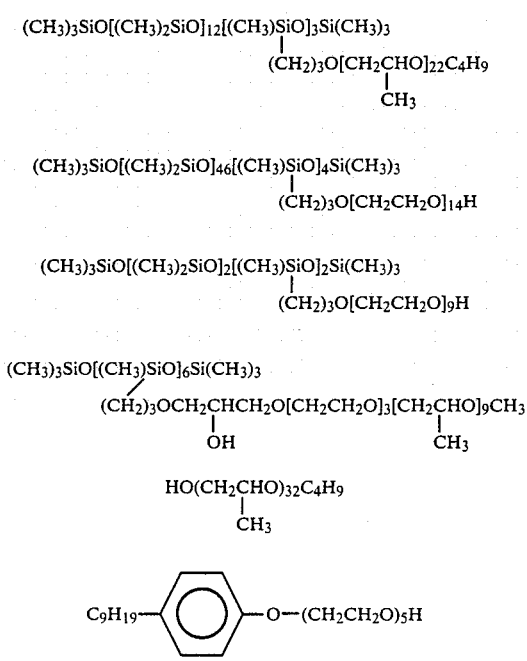

EXAMPLES

EXAMPLE 1

14 parts of a fumed silica having a specific surface area of 200 m$^2$/g was added to 100 parts of α,ω-bis(methyldimethoxysilyl)polydimethylsiloxane having a viscosity of 20,000 cP and mixed homogeneously to obtain a base compound B-1. Separately, 4 parts of methyltrimethoxysilane, 5 parts of γ-aminopropyltriethoxysilane, 1 part of dibutyltin dilaurate and 7 parts of N-trimethylsilyl-γ-aminopropyltriethoxysilane were mixed together to obtain a crosslinking mixture C-1.

100 parts of the base compound B-1, 4 parts of the crosslinking mixture C-1 and 1 part of A-1 were mixed together under moisture-free conditions to obtain a homogeneous mixture. The mixture was defoamed and extruded to form a sheet having 2 mm thickness, which was then cured by moisture in air. After about five minutes (min) the sheet became tack-free. The cured surface was not resinified and no cracks were noticed. The sheet was left to stand for 168 hours (h) and its physical properties were determined according to JIS K 6301. The hardness was 30, tensile strength was 21 kgf/cm$^2$ and elongation was 420%. When the cured product was immersed in water at 50° C. for 48 hours, no change was observed.

COMPARATIVE EXAMPLE 1

A composition was prepared in the same manner as in Example 1 using the same base compound B-1 and crosslinking mixture C-1 but without using A-1. The composition was cured in the same manner as in Example 1 to obtain an elastomer. The tack-free time of this product was 5 minutes. The surface of the product was resinified and shining and, when it was pressed even lightly, numerous fine cracks were formed. The product had a hardness of 32, tensile strength of 10 kgf/cm$^2$ and elongation of 230%. A rupture was grown from the cracked portion. When the cured product was immersed in water at 50° C. for 48 hours, its surface was whitened and it crumbled to tatters upon rubbing.

EXAMPLE 2

100 parts of the same base compound B-1 and 4 parts of the same crosslinking mixture C-1 as in Example 1 were mixed with one of the polyoxyalkylene chain-containing compounds A-1 to A-6 shown in Table 1 in the same manner as in Example 1 to prepare samples 21 to 28. Sample 21 was a comparative sample containing only a small amount of the polyoxyalkylene chain-containing compound.

The samples were cured in the same manner as in Example 1 to obtain elastomers. Their physical properties and surface conditions are shown in Table 1.

TABLE 1

| | Sample No. | | | | | | | |
|---|---|---|---|---|---|---|---|---|
| | 21 (Comp. Ex.) | 22 | 23 | 24 | 25 | 26 | 27 | 28 |
| Polyoxyalkylene chain-containing compound | | | | | | | | |
| variety | A-1 | A-1 | A-1 | A-2 | A-3 | A-4 | A-5 | A-6 |
| amount (part) | 0.01 | 2 | 5 | 1 | 1 | 2 | 1 | 1 |
| After curing | | | | | | | | |
| hardness (JIS A) | 32 | 31 | 27 | 30 | 31 | 29 | 30 | 28 |
| tensile strength kgf/cm$^2$ | 13 | 20 | 18 | 19 | 20 | 21 | 21 | 20 |
| elongation % | 200 | 450 | 520 | 410 | 400 | 460 | 430 | 410 |
| Surface conditions | | | | | | | | |
| after standing for 168 h | crack were | no crack | no crack | no crack | no crack | no crack | no crack | no crack |

TABLE 1-continued

| | Sample No. | | | | | | |
|---|---|---|---|---|---|---|---|
| | 21 (Comp. Ex.) | 22 | 23 | 24 | 25 | 26 | 27 | 28 |
| after immersion in water at 50° C. for 48 h | formed whitened | no change | no change | no change | no change | no change | no change | no change |

EXAMPLE 3

Mixtures C-2 to C-6 containing a crosslinking agent, catalyst and other additives and a mixture C-7 containing no crosslinking agent as shown in Table 2 were prepared. 100 parts of the same base compound as in Example 1 was mixed with one of the mixtures C-2 to C-7 and one of the polyoxyalkylene chain-containing compounds A-1 to A-3 in the same manner as in Example 1 to obtain samples 31 to 36 as shown in Table 3.

The samples were cured in the same manner as in Example 1 to obtain elastomers. Their physical properties and surface conditions are shown in Table 3.

TABLE 2

(The amounts are represented by parts)

| | Mixture No. | | | | | |
|---|---|---|---|---|---|---|
| | C-2 | C-3 | C-4 | C-5 | C-6 | C-7 |
| methyltrimethoxysilane | 4 | | | | 4 | |
| tetramethoxysilane | | 4 | | | | |
| vinyltrimethoxysilane | | | 5 | | | |
| methyltri(methoxyethoxy)silane | | | | 6 | | |
| γ-aminopropyltrimethoxysilane | 5 | 5 | 5 | | | 5 |
| N—(β-aminoethyl)-γ-aminopropyltrimethoxysilane | | | | 5 | 4 | |
| dibutyltin dilaurate | 1 | 1 | 1 | 1 | 1 | 1 |
| N—trimethylsilyl-γ-aminopropyltriethoxysilane | | 7 | 7 | 7 | | 7 |
| 1,1-dimethoxy-2-trimethylsilyl-1-sila-2-azacyclopentane | 5 | | | | 5 | |

TABLE 3

| | Sample No. | | | | | |
|---|---|---|---|---|---|---|
| | 31 | 32 | 33 | 34 | 35 | 36 |
| Mixture No. | C-2 | C-3 | C-4 | C-5 | C-6 | C-7 |
| amount (part) | 3.8 | 4.0 | 4.2 | 4.5 | 3.8 | 3.0 |
| Polyoxyalkylene chain-containing compound | | | | | | |
| No. | A-2 | A-3 | A-1 | A-1 | A-1 | A-1 |
| amount (part) | 1 | 1 | 1 | 1 | 1 | 1 |
| Tack-free time (min) | 5 | 4 | 4 | 5 | 5 | 5 |
| After curing | | | | | | |
| hardness (JIS A) | 30 | 23 | 28 | 31 | 30 | 25 |
| tensile strength kgf/cm² | 20 | 21 | 19 | 20 | 21 | 18 |
| elongation % | 430 | 410 | 390 | 400 | 410 | 600 |
| Surface conditions | | | | | | |
| after standing for 168 h | no crack | no crack | no crack | no crack | no crack | no crack |
| after immersion in water at 50° C. for 48 h | no change | no change | no change | no change | no change | no change |

EXAMPLE 4

14 parts of fumed silica having a specific surface area of 200 m²/g was added to 100 parts of α,ω-bis(trimethoxysilyl)polydimethylsiloxane having a viscosity of 10,000 cP and mixed homogeneously to obtain a base compound B-2.

100 parts of the base compound B-2 were mixed with 4.5 parts of the crosslinking mixture C-6 and 1 part of the polyoxyalkylene chain-containing compound A-1 in the same manner as in Example 1. After 5 minutes a tack-free condition was found. The surface of the product was not resinified and no crack was formed after the curing. The product was immersed in water at 50° C. for 48 hours. No change was recognized. The product has a hardness of 32, tensile strength of 17 kgf/cm² and elongation of 350%. Samples for the determination of lap shear adhesion strength were prepared from the composition and the strength was measured using aluminum according to the specification of JIS K 6850. After the curing, the samples had a lap shear adhesion strength of 12 kgf/cm².

EXAMPLE 5

14 parts of fumed silica having a specific surface area of 130 m²/g was added to 100 parts of α,ω-bis(methyldimethoxysilyl)polydimethylsiloxane having a viscosity of 1,000 cP and mixed homogeneously to obtain a base compound B-3. 100 parts of the base compound B-3 were mixed with 5 parts of the crosslinking mixture C-6 and 0.5 parts of the polyoxyalkylene chain-containing compound A-1 in a moisture-free vessel to obtain a fluid composition. The composition was cured to form a sheet in the same manner as in Example 1. After about 10 minutes a tack-free condition was observed. After curing the surface of the product was not resinified and no crack was formed. The product has a hardness of 25, tensile strength of 15 kgf/cm² and elongation of 280%. The product was immersed in water at 50° C. for 48 hours and no change was recognized.

We claim:

1. A room temperature curable polyorganosiloxane composition comprising:
(A) 100 parts by weight in total of:
(1) a polydiorganosiloxane of the general formula:

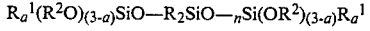

$$R_a^1(R^2O)_{(3-a)}SiO—R_2SiO—_nSi(OR^2)_{(3-a)}R_a^1$$

wherein R and $R^1$ are the same or different and represent a monovalent substituted or unsubstituted hydrocarbon group, $R^2$ represents a monovalent group selected from the group consisting of alkyl groups having 1 to 4 carbon atoms and alkoxyalkyl groups having 1 to 6 carbon atoms in total, a represents a number of 0 or 1 and n represents a number for controlling the viscosity of (a) from 100 to 500,000 cP at 25° C., and
(2) a silane of the general formula:

$$R_b{}^3Si(OR^4)_{4-b}$$

wherein $R^3$ represents a monovalent substituted or unsubstituted hydrocarbon group, $R^4$ represents a monovalent group selected from the group consisting of alkyl groups having 1 to 4 carbon atoms and alkoxyalkyl groups having 1 to 6 carbon atoms in total and b represents a number of 0 or 1, or a partially hydrolyzed condensate thereof with the proviso that the amount of (A)(1) is 85 to 100 wt. % based on the total of (A)(1) and (A)(2);

(B) 0.01 to 10 parts by weight of a curing catalyst;

(C) 0.5 to 10 parts by weight of a nitrogen-containing silicon compound in which the nitrogen atom is bonded with a silicon atom through one or more carbon atoms and said nitrogen atom is further bonded directly with said silicon atom or another silicon atom; and (D) 0.05 to 50 parts by weight of a polyoxyalkylene chain-containing compound.

2. A composition according to claim 1 wherein the terminal group of (A)(1) is a methyldimethoxysilyl group.

3. A composition according to claim 2 wherein (A)(1) is a polydimethylsiloxane terminated with a methyldimethoxysilyl group.

4. A composition according to claim 1 wherein the terminal group of (A)(1) is a trimethoxysilyl group.

5. A composition according to claim 1 wherein the viscosity of (A)(1) at 25° C. is 500 to 200,000 cP.

6. A composition according to claim 1 wherein $R^4$ of (A)(2) is a methyl group.

7. A composition according to claim 6 wherein (A)(2) is tetramethoxysilane.

8. A composition according to claim 6 wherein (A)(2) is methyltrimethoxysilane.

9. A composition according to claim 6 wherein (A)(2) is vinyltrimethoxysilane.

10. A composition according to claim 1 wherein $R^4$ of (A)(2) is a methoxymethyl group.

11. A composition according to claim 1 wherein the amount of (A)(2) is 0.4 to 5 wt. % based on (A).

12. A composition of according to claim 1 wherein (B) is an organotin compound.

13. A composition according to claim 1 wherein the amount of (B) is 0.1 to 1 part by weight.

14. A composition according to claim 1 wherein (C) is N-trimethylsilyl-γ-aminopropyltriethoxysilane.

15. A composition according to claim 1 wherein (C) is 1,1-dimethoxy-2-trimethylsilyl-1-sila-2-azacyclopentane.

16. A composition according to claim 1 wherein (C) is poly(1,1-dimethoxy-5-trimethylsilyl-1-sila-5-azapentane).

17. A composition according to claim 1 wherein the amount of (C) is 1 to 5 parts by weight.

18. A composition according to claim 1 wherein (D) is polyoxyalkylene.

19. A composition according to claim 1 wherein (D) is a polyorganosiloxane/polyoxyalkylene copolymer.

20. A composition according to claim 1 wherein the amount of (D) is 0.1 to 10 parts by weight.

* * * * *